United States Patent Office 3,560,918
Patented Feb. 2, 1971

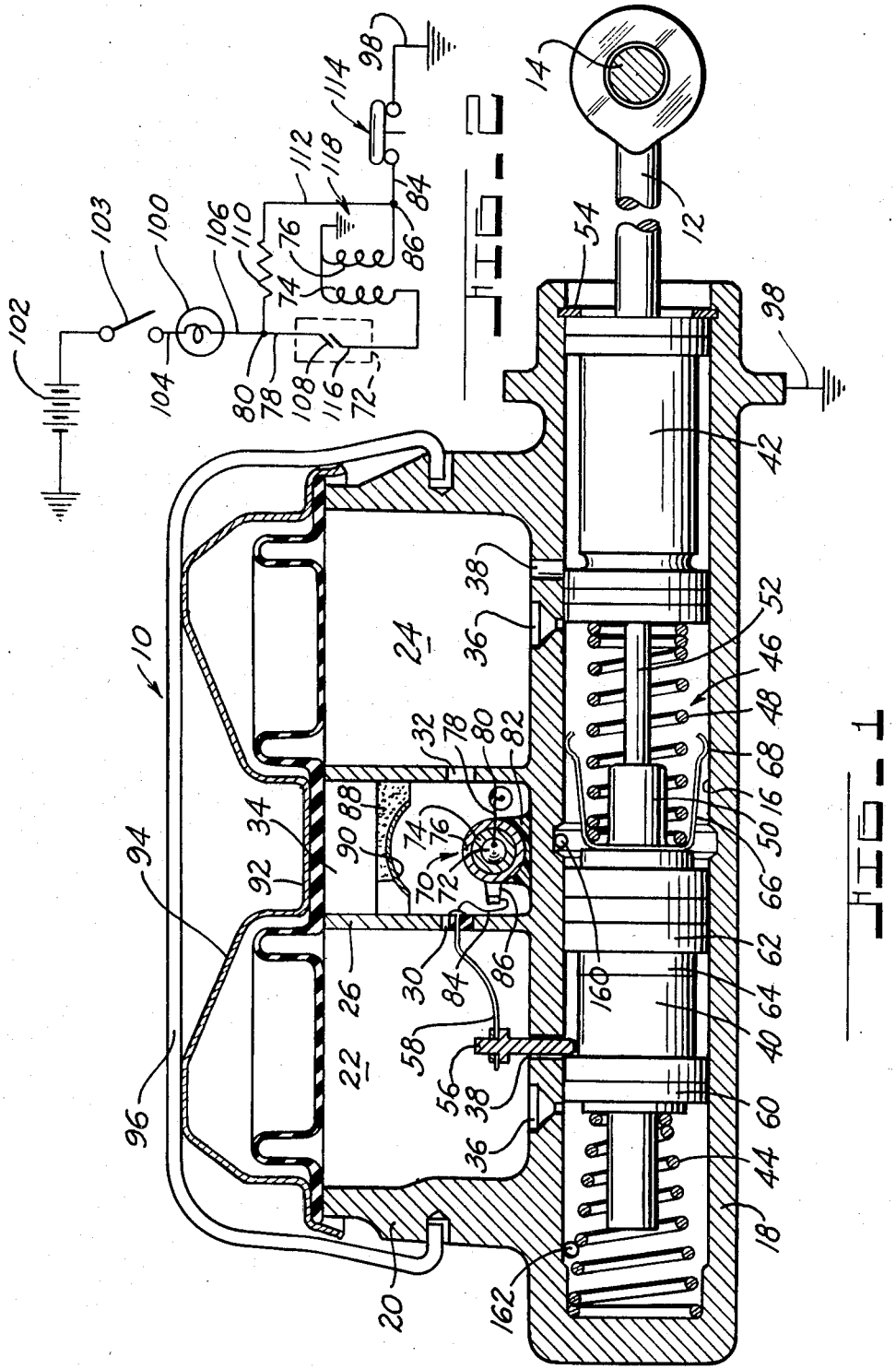

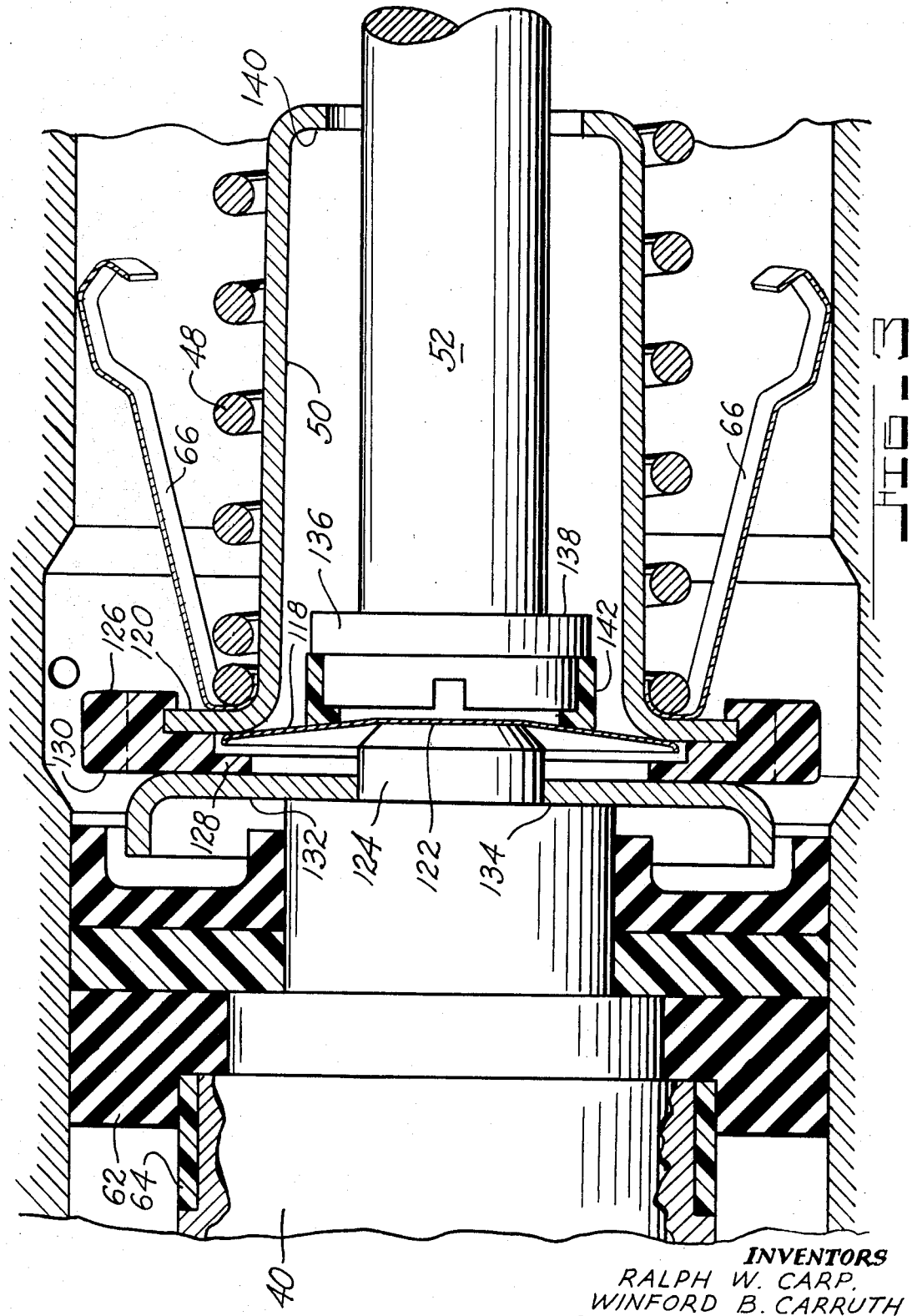

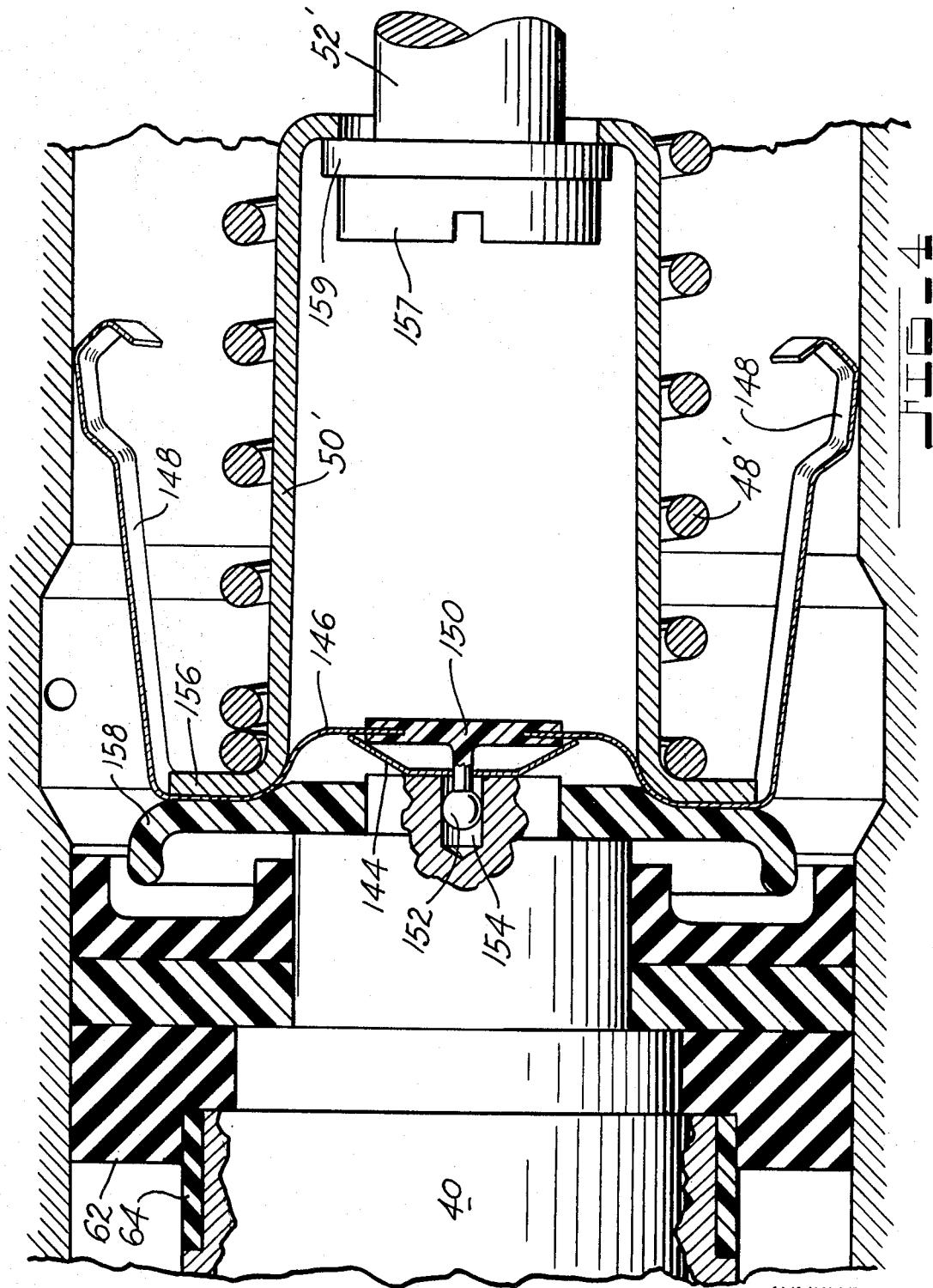

3,560,918
INDICATOR MEANS FOR FLUID PRESSURE
AND FLUID SUPPLY
Richard L. Lewis, George M. Tam, and Raymond A.
Reznicek, St. Joseph, Mich., and Winford Boyd Carruth and Ralph Wolf Carp, Baltimore, Md., assignors
to The Bendix Corporation, a corporation of Delaware
Filed Dec. 8, 1967, Ser. No. 689,088
Int. Cl. B60t 17/22
U.S. Cl. 340—52                                    12 Claims

ABSTRACT OF THE DISCLOSURE

Magnetic switch means within a fluid actuator having a closed electrical circuit means operative on failure to develop pressure and/or low fluid supply to warn an operator of such problems.

SUMMARY

In the art of providing indicators for warning an operator that fluid pressure has not been developed by a fluid pressure actuator, e.g., a brake system master cylinder, or that fluid supply is low, there have been numerous patents. For example, U.S. Pat. Nos. 2,046,316; 2,353,304; Re. 23,377; and 3,011,595 have been observed related to warning devices for low pressure developments; and U.S. Patent Nos. 2,494,802; 2,613,293; 2,744,177; 2,820,865 and 3,319,240 have been observed relating to low fluid supply warning devices.

Prior art devices observed related to combining a fluid level indicator and a pressure development indicator in a brake master cylinder is found in U.S. Pat. No. 2,940,560.

However, none of the prior art patents appear to be dealing with providing a common indicating means for both of these functions; nor do they appear to address to the problem of eliminating electrolytic action within the fluid of the actuator causing corrosive problems. This invention has as a distinct object the combination of fluid supply level indication and functional failure indication in a single means that is not productive of any of the problems observed with the prior art devices.

In addition, with the state of the art of split master cylinders for the automotive industry today or any tandem actuator having separate pressure development within a common bore means, a true functional failure analysis of the chambers between the pistons operatively related in the bore can only be accomplished when the warning mechanism is sensitive to abnormal travel of the piston means. It is therefore an object of this invention to provide such a warning mechanism within the structure of such actuators.

It has been observed that other inventors in the prior art have addressed to the problem of travel for combined fluid actuators, as is evidenced by U.S. Pat. No. 3,067,842. However, it is readily obvious from this patent that the manner in which the inventors have addressed themselves to the problem is as different as the manner of providing split system actuators in today's market; i.e., it has been thought that split system actuators are best provided by having parallel bore means with piston means operated via a walking beam from a common lever arrangement. Needless to say this has required duplicate manufacturing processes impractical in today's art because of economics, if for no other reason.

RELATED PATENTS AND APPLICATIONS

Applicants have noted a related Pat. No. 3,228,194 assigned to the common assignee of this invention as well as related U.S. Pat. Nos. 3,427,582; 3,358,446; 3,439,-322; 3,393,514; 3,421,321; 3,412,557; 3,416,315; 3,421,-322; 3,448,579; U.S. patent application Ser. No. 655,581 filed Sept. 5, 1967, and U.S. Pat. No. 3,461,447, assigned to Societe Anonyme, d.b.a., a licensee of applicant's assignee, which all generally relate to indicators for providing an awareness of a pressure failure in a split system type master cylinder of today's art.

As with the prior art patents recited in the summary above, the distinctions of this invention over the related patent and applications and the application filed for the common assignee's licensee will be readily apparent from observing the drawings and the description which follows:

DRAWING DESCRIPTION

FIG. 1 is a partial cross section view of a master cylinder incorporating a common signal sending means for providing an indication of abnormal travel and low fluid level in a split master cylinder in accordance with the principles of this invention;

FIG. 2 is a schematic electrical diagram;

FIG. 3 is an enlarged cross sectional view of the master cylinder of FIG. 1, and more particularly the switch means between the piston means of the master cylinder; and FIG. 4 is an enlarged cross sectional detail of a modification of the switch means between the piston means of the master cylinder.

DETAILED DESCRIPTION

With more particular regard now to FIG. 1 there is shown a master cylinder 10 that is actuatable by a push rod 12 connected by a pin 14 to a brake pedal (not shown) within the passenger compartment of the vehicle. The master cylinder 10 is constructed to have a bore 16 within a housing 18 that is provided with an annular wall 20 defining a reservoir chamber which is separated into two compartments 22 and 24 by means of an annular partition 26 having passages 30 and 32 approximately ¾ inch from the bottom of the reservoir chamber. The partition 26 defines a well 34 between the compartments 22 and 24, which are each communicated by means of drilled passages 36 and 38 to the bore 16.

Within the bore 16 a pair of pistons 40 and 42 are assembled such that a return spring 44 is operatively arranged between the end of the bore 16 and the piston 40 and the caged spring assembly 46 comprised of spring 48, retainer 50 and caging means 52 between the pistons 40 and 42 normally position the rearwardmost piston 42 against retainer ring 54 within a groove adjacent the open end of the bore 16 of the housing 18. A contact 56 is biased by a spring arm 58 to engage the intermediate body of the piston 40 between its primary seal 60 and its secondary seal 62. This intermediate body is provided with a plastic ring 64 in a recessed portion adjacent the secondary seal 62. Spring fingers 66 are assembled between the retainer 50 and the caged spring 48, which spring fingers terminate in rounded surface extending contacting the bore surface, as at 68, in the normal attitude. Piston 40 is insulated from the housing of the master cylinder.

Within the well a magnetically operable switch 70 is located having a non-conductive tubular housing 72 about which a latching coil 74 and a pull-in coil 76 are oriented. A lead 78 connects a terminal on the switch housing 72 to an external terminal 80 for connecting to an electric system of the associated vehicle exteriorly of the wall 20 of the master cylinder 10. An adhesive 82 joined the switch 70 to the bottom of the well 34, and a lead 84 connects the spring arm 58 to a terminal 86 leading to another contact within the switch housing 72, as will be explained with reference to FIG. 2 hereinafter. A cork float 88 having a semicircular magnet 90 on its bottom side is then positioned within the well to float therein so long as hydraulic fluid within the chambers 22 and 24 is of a predetermined level to be spaced from the switch means 70 so that the magnetic field of the magnet 90 extending below the float 88 is removed from the switch 70.

The assembly of the master cylinder is completed by placing a diaphragm seal means 92 over the annular wall 20 and the annular well partition 26 and is held thereagainst by a cap 94 that is joined to the master cylinder housing 18 by means of a bail 96.

With reference now to the electrical circuitry not only of the switch 70 within the master cylinder, but of its connection via the master cylinder to a ground potential as at 98 and an electric light 100 the reader's attention is directed to FIG. 2. In this figure an electrical power supply such as the vehicle's storage battery 102 is shown connected via an ignition switch 103 by a lead 104 to a terminal of the light 100. A lead 106 is connected to another terminal of the light 100 completing the circuit therethrough and to a terminal 80. The lead 78 connects switch contact 108 to terminal 80, to which a resistance 110 is also connected. A ground diverting lead 112 is connected via a normally closed switch means 114 to the ground connection 98. The switch means 114 is comprised of the contact 56 shown in FIG. 2 and the switch elements associated with the cage spring assembly described hereinafter. As seen, the terminal 86 is connected to another switch contact 116 with the switch contacts 108 and 116 being within the non-conductive housing 72 shown in dashed lines in FIG. 2. The pull-in coil 76 and latching coil 74 are commonly connected to a ground potential as at 118 so that the coils are energized whenever the ground diverting circuit is broken by opening switch 114, as will be explained further hereinafter with respect to FIGS. 3 and 4. Resistor 110 is such that the current flow through lamp 100 is too small to light it.

With regard now to FIG. 3, the embodiment of the switch elements associated with the caged spring assembly forming a portion of the closed master cylinder switch means 114 is shown to comprise a switch plate or fingers 118 in the form of a spring washer biased by radial flange 120 of the retainer 50 against the face 122 of a central projection 124 of the piston 40. The radial flange 120 of the retainer 50 has affixed to it an insulator ring 126 having an inner ring portion 128 on its surface 130 that abuts seal retainer 132 fitted over the projection 124 and held against rearward face 134 of piston 40 by the action of the spring 48. The caging means 52 in the form of a bolt having a head 136 and a flange 138, which in the normal attitude of the master cylinder is in contact wtih the face 140 of the retainer 50 has an insulating ring 142. The insulating ring 142 abuts on the spring washer 118 to actuate the switch plate 118 whenever abnormal relative motion occurs between piston 40 and piston 42, such as is beginning to take place in the position of the elements shown in FIG. 3. As seen also in FIG. 3, the spring 48 maintains the spring fingers 66 against the radial flange 120 to complete the assembly of the cage spring means 46 to the piston 42.

With reference now to another embodiment of the invention the reader's attention is directed to FIG. 4 showing a similar switching mechanism embodying a switch plate 144 engaging a central body 146 of the spring fingers 148 united by an insulator 150 having a ball surface 152 slidably received within a bore 154 in the rearwardmost face of the secondary piston 40. In this modification the spring fingers are assembled on the opposite side of radial flange 156 of retainer 50' between the flange 156 and a plastic seal retainer 158.

In this embodiment the caging means 52' is provided with a head 157 and flange 159 shown in the normal position to be expected of these elements with relation to the retainer 50', and in view of the plug 150 there is no need to provide an insulator ring to the head 157 as with the embodiment of FIG. 3.

OPERATION

In operation and assuming a normally functioning master cylinder with an adequate fluid level in the compartments 22 and 24 to cause the float 88 to assume the position of FIG. 1, an operator will depress the brake pedal to move the pistons 40 and 42 to first generate outlet pressure for the secondary fluid discharge port 162 and thereafter generate outlet pressure for the primary fluid discharge port 160 by relative motion taking place between pistons 40 and 42. It should be noted that during this normal operation the ground potential is diverted from the coils 74 and 76 so that the contacts 108 and 116 are maintained in their open attitude, and the resistance 110 is such that the current will be small enough to avoid a visible glow from the lamp 100.

In the event that the piston 40 is unable to develop discharge pressure within the chamber of the bore 16 ahead of the outlet 162, it will be translated so that the contact 56 will move onto the insulating ring 64 breaking the ground diverting circuit through the master cylinder. This will then allow sufficient current to flow through the large number of coils of pull-in-coil 76 via the ground 118 to create an electromagnetic field about the housing 72 that will close the contacts 108 and 116 completing the signal lamp circuit. Current flow is now sufficient to light lamp 100 as resistance 110 is taken out of the circuit. In addition, lamp current through latching coil 74 will create a magnetic field sufficient to maintain the switch contacts 108 and 116 in their closed position after the brake is relaxed and the circuit through the master cylinder is reestablished as by removing the contact 56 from the insulating ring 64 onto the intermediate conductive body portion of the piston. 40.

Likewise, if the relative motion of the piston 42 with respect to the piston 40 is more than desired for providing sufficient braking pressure at the outlet 160, and with reference to the structure of FIG. 3, the caging means will move to the position shown in FIG. 3. Further movement of the caging means thereafter will cause insulating ring 142 to move the switch plate 118 away from the flanges 120 of the retainer 50 onto the inner ring portion 128 of the insulating ring 126. This opens the ground diverting circuit, as aforementioned with respect to overtravel of the piston 40. Current flows then to the coil 76 to close the switch contacts 108 and 116 and thus provide adequate current flow to light lamp 100.

If after successive operations the fluid level in the compartments 22 and 24 should happen to drop below the passage means 32, the float 88 will position the semi-circular magnet to the extent that flux is again induced within the switch housing 72 to close the contacts 108 and 116. In this regard the magnet is positioned and designed to induce the flux within the switch housing 72 in the same direction as the electromagnetic field of the latching coil. If the ignition switch 103 is closed, lamp 100 will light. It should also be noted that as the latching coil is not involved in sensing the fluid level, the refilling of the compartments 22 and 24 to their appropriate level will re-establish the position of the float 88 such that the flux induced by the magnet will be removed from the switch means 70 and the contacts 108 and 116 will automatically re-open, if switch 103 is open, i.e. ignition switch 103 must be opened before lamp 100 will be deenergized by raising float 88.

With respect to the modification of the structure of FIG. 4, it should be noted that the caging means 52' will in this instance, upon abnormal retravel between the pistons 40 and 42, will engage the plug 150 and cause the switch plate 144 to move away from the central body portion 146 of the spring fingers 148 to open the ground diverting circuit through the master cylinder. As in the case of operating the switch plate 118 by the insulating ring 142 positioning it onto the depending portions 128 of ring 126 as described with respect to the embodiment of FIG. 3, the resistance 110 is eliminated from the ground circuit for lamp 100, and its glow will now be visible.

It should be noted in this embodiment of FIG. 4 that the plug 150 is between the secondary piston 40 and the bolt head 157 so that the ground diverting circuit cannot be inadvertently reestablished by abnormal relative motion between pistons 40 and 42 switch element 144 is actuated.

Having described an operative construction for this invention and certain modifications which may be possible without in any sense trying to limit the invention to the embodiments described and illustrated, it is now desired to set forth the intended protection sought by these Letters Patent in the form of appended claims.

We claim:

1. In a master cylinder having a housing defining a reservoir therewithin for storing a liquid:
    magnetically operated switch means mounted within said housing and adapted to actuate a warning device upon closing of the switch means;
    a float disposed within said reservoir for vertical movement within the latter in response to variations in the level of said liquid; and
    a magnet mounted in said float;
    said magnet closing said switch means when the surface level of the liquid falls to a point disposing the magnet in a position wherein the magnetic field of the latter envelopes said switch means to thereby actuate said warning device.

2. The invention of claim 1; and
    electromagnetic means operatively connected to said switch means to maintain the latter closed after initial closing by said magnet.

3. The invention of claim 1:
    said switch means being mounted in the bottom of said reservoir;
    said magnet being mounted on the bottom of said float whereby the magnetic field of the magnet extends below the level of the liquid.

4. In a master cylinder:
    a housing defining a bore and a fluid reservoir therewithin in fluid communication with said bore;
    a primary piston and a secondary piston slidable in said bore;
    overtravel switch means carried by said pistons;
    said overtravel switch means being operated by one of said pistons upon abnormal relative movement between said pistons;
    magnetically operated switch means mounted in said reservoir;
    a magnet movable toward and away from said magnetically operated switch means in response to variations in the level of the liquid in the reservoir;
    said magnet closing said magnetically operated switch means when the liquid level in said reservoir drops below a predetermined level;
    each of said switch means being adapted to actuate a warning device upon operation of the respective switch means.

5. The invention of claim 4; and
    electromagnetic means in said reservoir operatively connected to said magnetically operated switch means;
    said electromagnetic means including a first coil activated by operation of said overtravel switch means for operating said magnetically operated switch means.

6. The invention of claim 5:
    said electromagnetic means including a second coil activated by closing of said magnetically operated switch means to maintain the latter closed after initial closing by said magnet or by operation of said overtravel switch means.

7. The invention of claim 4:
    said overtravel switch means including a contact operatively connected to one of said pistons and including a portion engaging the wall of the bore, a resilient washer carried by the other piston, the resiliency of the washer normally urging the outer periphery of the latter into engagement with said contact, said one piston driving the periphery of said washer out of engagement with said contact upon said abnormal relative movement between the pistons.

8. The invention of claim 7:
    said one piston having an electrically insulative material mounted thereon for engagement with said washer upon said abnormal relative movement between said pistons.

9. The invention of claim 7:
    said contact including a section of electrically insulative material disposed between said one piston and said washer;
    the periphery of said washer engaging said contact about a circumference disposed radially outwardly from said section;
    said one piston forcing said section against said washer to drive the outer periphery of the latter out of engagement with said contact upon said abnormal relative movement between said pistons.

10. In a master cylinder:
    a housing defining a bore therewithin;
    a primary piston and a secondary piston slidable in said bore;
    overtravel switch means carried by said pistons responsive to abnormal relative movement between said pistons;
    said overtravel switch means including a contact operatively connected to one of said pistons and including a portion engaging the wall of said bore, a resilient washer carried by the other pistons, the resiliency of the washer normally urging the outer periphery of the latter into engagement with said contact, said one piston driving the periphery of said washer out of engagement with said contact upon said abnormal relative movement between the pistons.

11. The invention of claim 10:
    said one piston having an insulating material mounted thereon for engagement with said washer upon said abnormal relative movement between said pistons.

12. The invention of claim 10:
    said contact including a section of electrically insulative material disposed between said one piston and said washer;
    the periphery of said washer engaging said contact about a circumference disposed radially outwardly from said section;
    said one piston forcing said section against said washer to drive the outer periphery of the latter out of engagement with said contact upon said abnormal relative movement between said pistons.

References Cited

UNITED STATES PATENTS 3,421,322   1/1969   Reznicek _____ 340—52UX
3,450,853   6/1969   Snyder _____ 340—52X ALVIN H. WARING, Primary Examiner U.S. Cl. X.R.

200—82, 84; 340—59, 242, 244